United States Patent [19]

Agius

[11] Patent Number: 4,976,763
[45] Date of Patent: Dec. 11, 1990

[54] INSTALLATION FOR CURVING AND TEMPERING A SHEET OF GLASS

[75] Inventor: Michel Agius, Santeuil, France

[73] Assignee: Selas S.A., Levallois-Perret, France

[21] Appl. No.: 495,593

[22] Filed: Mar. 19, 1990

[30] Foreign Application Priority Data

Mar. 22, 1989 [FR] France ............................... 89 03760

[51] Int. Cl.⁵ ............................................. C03B 23/02
[52] U.S. Cl. ...................................... 65/287; 65/289; 65/290; 65/348
[58] Field of Search .................. 65/287, 289, 290, 348

[56] References Cited

U.S. PATENT DOCUMENTS

| | | | |
|---|---|---|---|
| 3,682,613 | 8/1972 | Johnson et al. ........................ | 65/289 |
| 4,015,969 | 4/1977 | Brown et al. .......................... | 65/289 |
| 4,597,789 | 7/1986 | Reese ..................................... | 65/287 X |
| 4,756,735 | 7/1988 | Cathers et al. ....................... | 65/289 X |
| 4,784,681 | 11/1988 | McMaster .............................. | 65/287 X |
| 4,822,398 | 4/1989 | McMaster et al. ................... | 65/290 X |

FOREIGN PATENT DOCUMENTS

| | | |
|---|---|---|
| 0139524 | 5/1985 | European Pat. Off. . |
| 0154892 | 9/1985 | European Pat. Off. . |
| 0261611 | 3/1988 | European Pat. Off. . |
| WO85/03068 | 7/1985 | World Int. Prop. O. . |
| WO89/01458 | 2/1989 | World Int. Prop. O. . |

Primary Examiner—Robert L. Lindsay
Attorney, Agent, or Firm—Young & Thompson

[57] ABSTRACT

The installation for curving or bending to convex form and tempering a sheet of glass (1) comprises means for heating the sheet and means for bringing this latter between elements (3, 4, 6, 7) for shaping said sheet.

One of the series (3) of elements has a surface (3a) which is intended to come into contact with one of the faces of the glass sheet (1). The other series of elements (4, 6, 7) has a stationary portion (5) to which is attached at least one movable portion (6 or 7) which is capable of pivotal displacement through an angle corresponding to the curvature to be given to the glass sheet.

13 Claims, 4 Drawing Sheets

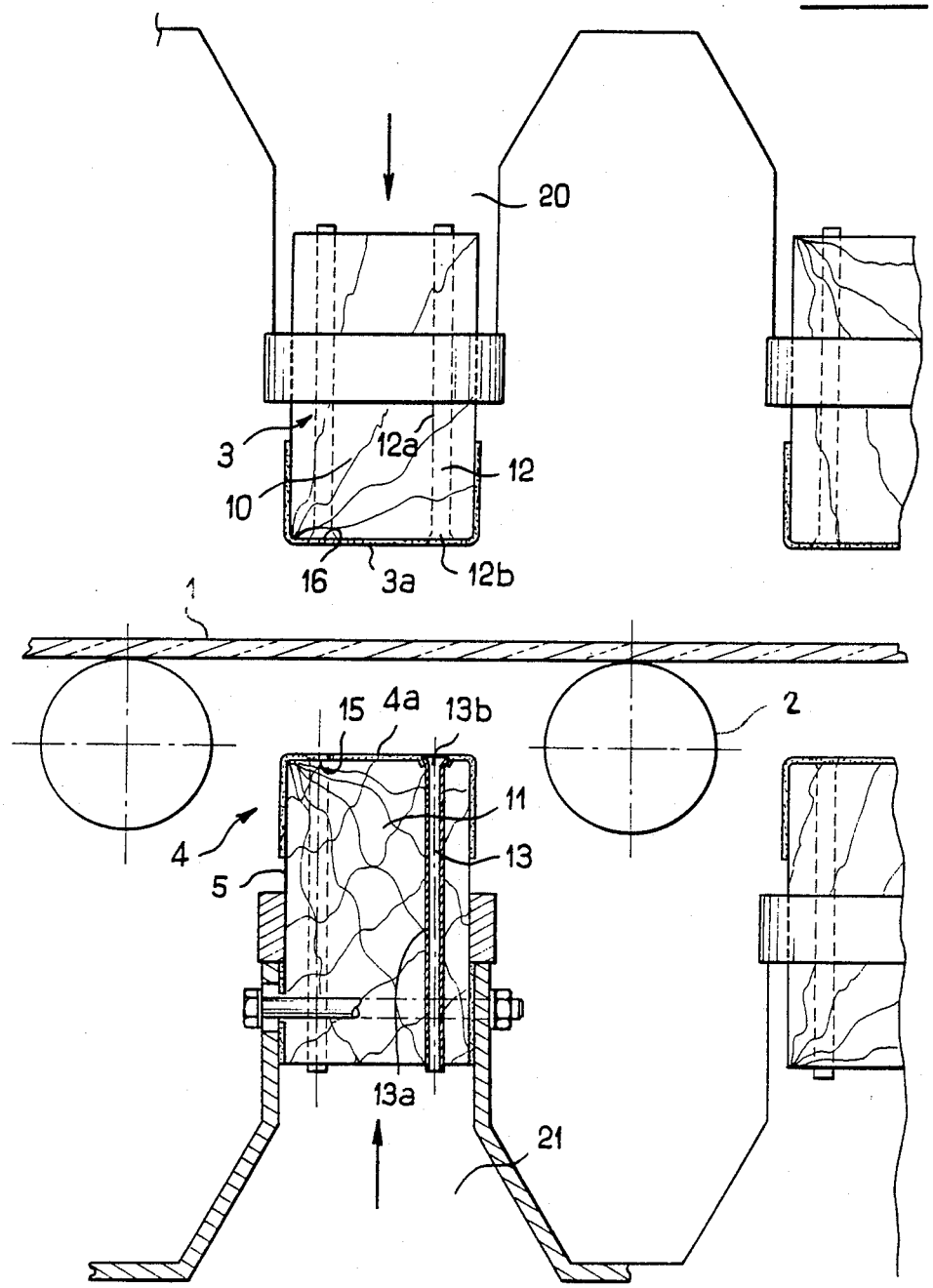
FIG_2

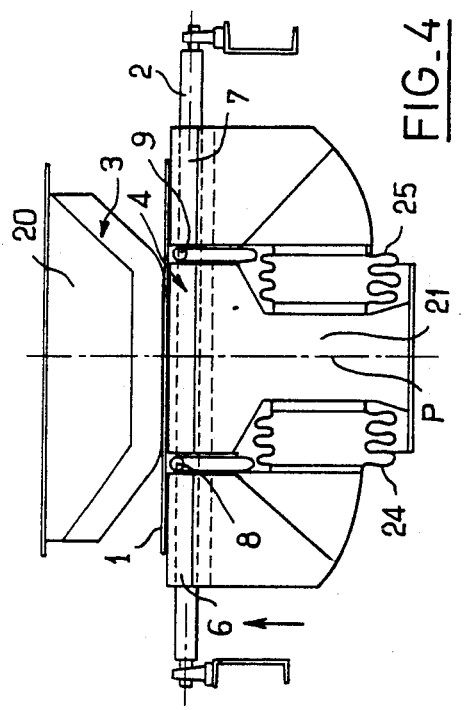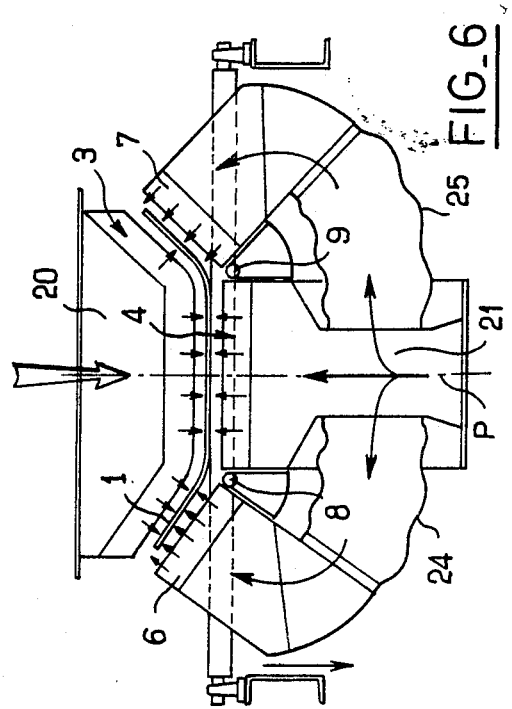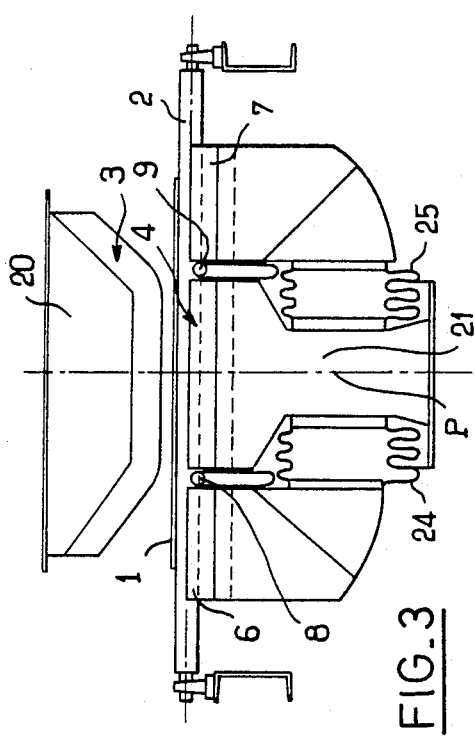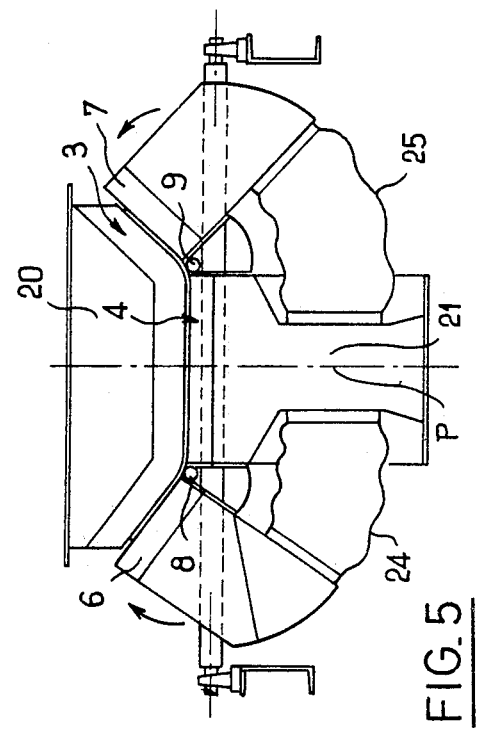

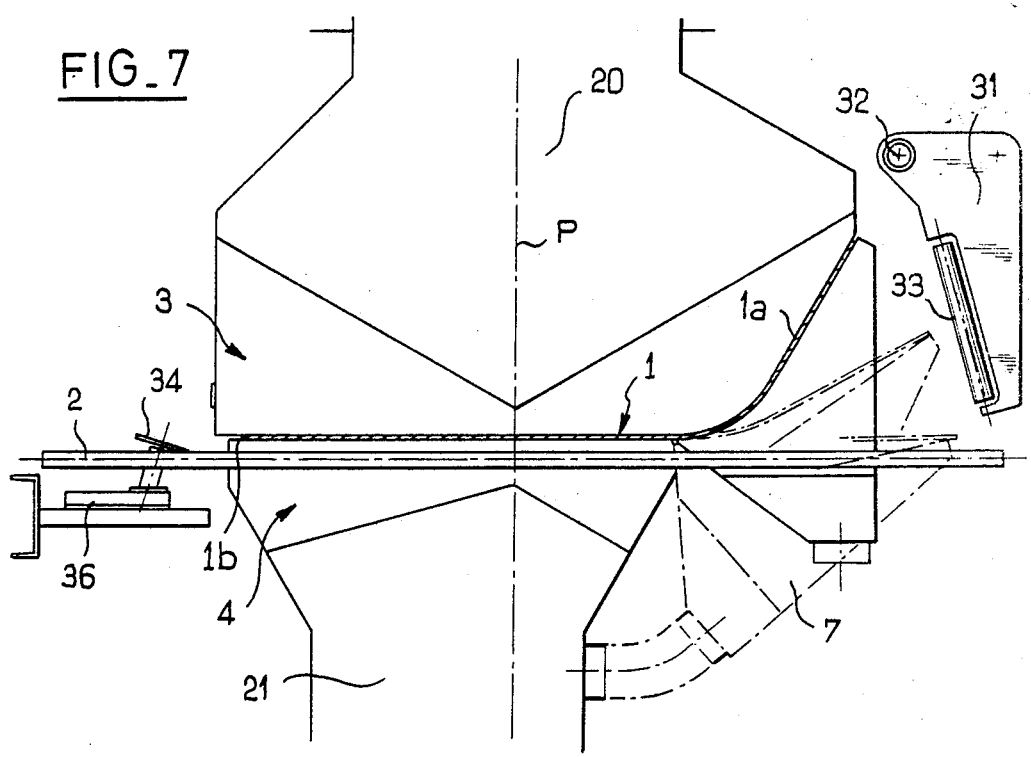
FIG_7
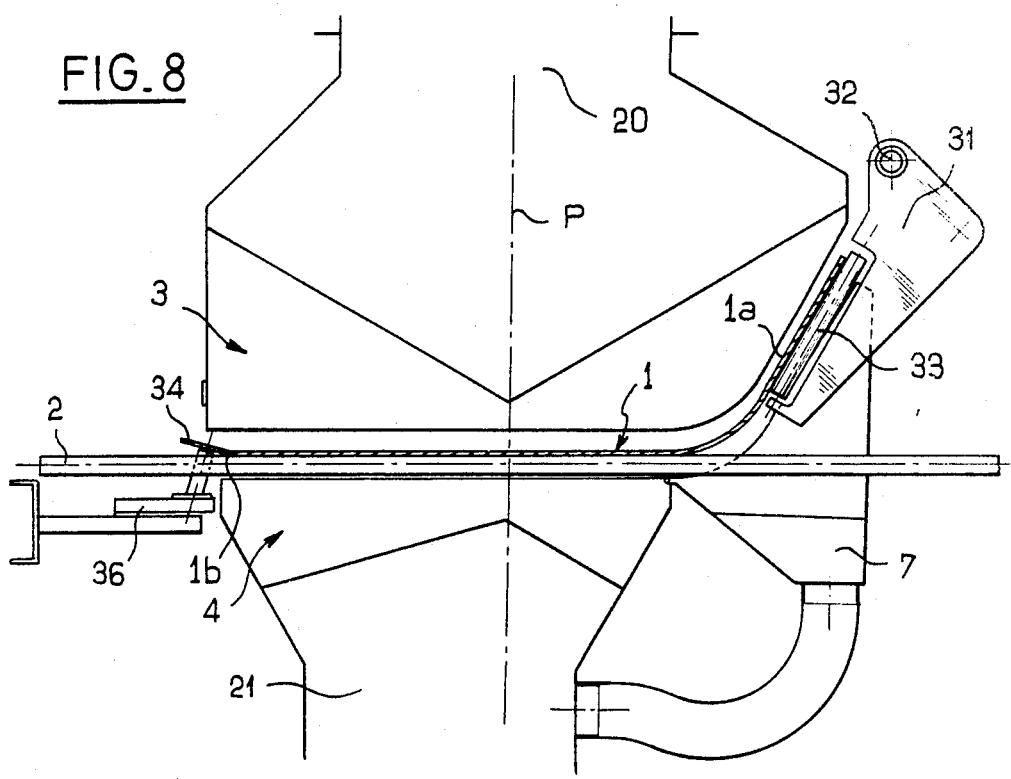
FIG_8

INSTALLATION FOR CURVING AND TEMPERING A SHEET OF GLASS

BACKGROUND OF THE INVENTION

1. Field of the Invention

The present invention relates to an installation for curving or bending to convex form and tempering a sheet of glass.

The primary aim of the invention is to produce glass panels bordered by one or two lateral sections which are inclined to the flat portion of the panel at an angle ranging in value between a few degrees and 90°.

2. Description of the Prior Art

There is known in particular, as disclosed in U.S. Pat. No. 4,784,681, an installation for uniformly curving a sheet of glass next to a furnace in which said sheet is heated to a sufficient temperature to ensure that the sheet is uniformly curved or bent to convex form. After heating, the sheet is brought into position between elements for shaping said sheet.

To this end, the installation is provided with means for applying the aforesaid elements on each side of the heated glass sheet so as to curve or bend this latter in accordance with the desired profile.

An essential characteristic of the installation described in U.S. Pat. No. 4,787,681 lies in the fact that the glass sheet is tempered by gas jets which are blown onto the sheet while it is engaged between the elements which bend the sheet. Moreover, these gas jets are blown by nozzles which are separate and distinct from the elements for shaping the glass sheet.

The chief disadvantage of this known installation lies in the fact that it does not permit the fabrication of glass panels having sections which make a large angle with the flat portion of the panels.

There is in fact a considerable demand for panels of this type.

Moreover, efficiency and uniformity of tempering are reduced by the fact that the tempering gas jets are blown in zones which are separate and distinct from those on which the elements for shaping the glass sheet are applied.

Patent No. WO-A-8901458 describes an apparatus for bending to convex form a glass sheet comprising an upper plate and a lower plate each composed of several elements joined to each other so that the two plates can assume the shape of a circular arc and the glass sheet located between the two plates can thus be given this arcuate shape.

In addition, these plates do not make it possible to form glass articles having a substantially flat central portion bordered on one side or on both sides by a section which makes a large angle with the central portion, for example between 30 and 90°.

The aim of the present invention is to overcome the disadvantages of the known embodiment aforesaid by creating an installation which makes it possible to increase the angle of curvature or of bending of the glass sheets and to improve the conditions of tempering of these latter.

SUMMARY OF THE INVENTION

The installation for curving and tempering a glass sheet thus comprises means for bringing this latter between elements which serve to shape said sheet, means for applying said elements on each side of said sheet and for curving this latter and means for sending jets of gas onto the sheet in order to temper this latter.

In accordance with the invention, the distinctive feature of this installation lies in the fact that one of the series of elements has a surface which is intended to come into contact with one of the faces of the glass sheet and has a predetermined profile corresponding to the curvature to be given to said sheet, said surface being such as to have a substantially flat portion bordered on at least one side by a section which is inclined at an angle (a) with respect to said flat portion and extends transversely to the direction of displacement of the glass sheet, and that the other series of elements which is intended to come into contact with the other face of the glass sheet has a stationary portion corresponding to the substantially flat central portion of the surface of the element, at least one movable portion being attached to said stationary portion and capable of pivoting about a pin which is parallel to the direction of displacement of the glass sheet, between a first position and a second position in which said movable portion is inclined at an angle (a) with respect to said stationary portion corresponding to the curvature to be given to the glass sheet.

The pivotally mounted movable portion of one of the series of elements thus makes it possible to bend one edge of the glass sheet at an angle which may attain 90°.

In an advantageous embodiment of the invention, said elements are constituted by blocks having through-ducts perpendicular to the surface of said blocks which is intended to come into contact with the glass sheet, said ducts being connected to a source of gas which has the function of tempering the glass sheet.

The ducts aforesaid thus have their openings at the surface of the elements which is intended to come into contact with the glass sheet. This arrangement makes it possible to increase the efficiency and uniformity of tempering while avoiding any danger of existence of zones in which the glass is insufficiently tempered and in which it remains deformable.

In a preferred embodiment of the invention, the aforementioned other series of elements has a stationary portion to which are pivotally attached on each side two movable portions which are capable of displacement between said first and second positions. It is thus possible to form a glass panel bordered on each side by a bent-back section which is inclined at a large angle with respect to the flat central portion.

Preferably, the first series of elements located above the glass sheet is stationary whilst the second series of elements located beneath said sheet is displaceable in a vertical plane between a position in spaced relation to the glass sheet located between the two series of elements and a position in which said second series of elements lifts the glass sheet and applies this latter against the first series of elements Preferably also, the installation comprises means for initiating the outward displacement of said second series of elements after application of these latter on the glass sheet and inward bending of said sheet and for initiating the supply of tempering gas jets only on completion of this operation.

Thus in contrast to the teachings of U.S. Pat. No. 4,784,681, the tempering gas is blown onto the glass sheet only after the shaping elements have been moved away from the sheet, thus permitting the achievement of uniform tempering, including within the zone of glass which has been in contact with the elements aforesaid.

BRIEF DESCRIPTION OF THE DRAWINGS

FIG. 2 is a sectional view to a larger scale along the plane II—II of FIG. 1.

FIGS. 3, 4, 5, 6 show different schematic views of the installation corresponding to the successive stages of operation of this latter.

FIG. 7 is a diagram relating to a variant of the installation in the position of pressing of the glass sheet.

FIG. 8 is a diagram which is similar to FIG. 7, in the position of tempering of the glass sheet

DESCRIPTION OF THE PREFERRED EMBODIMENTS

Figure 1:
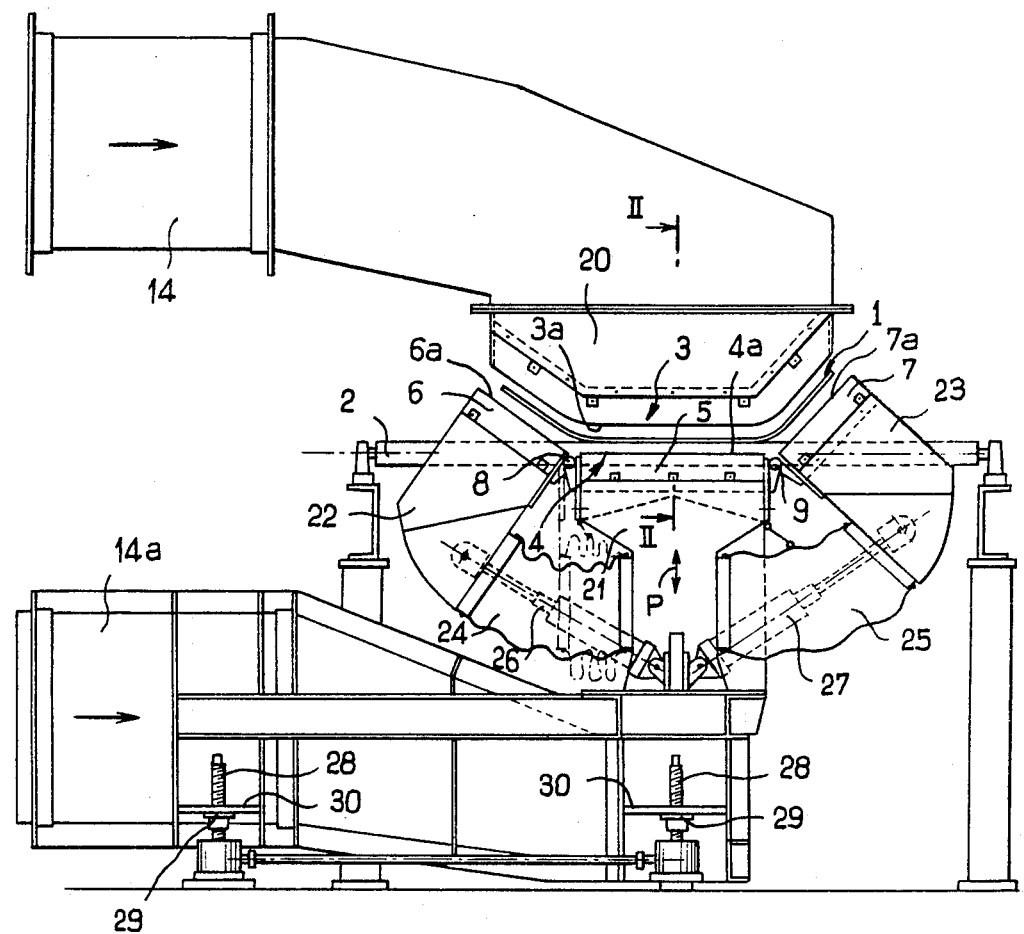
FIG. 1 is a schematic view of the installation in accordance with the invention, taken at right angles to the direction of displacement of the glass sheet.

The installation in accordance with FIG. 1 for curving and tempering the glass sheet 1 is located downstream of a furnace in which the sheet is heated to a temperature of sufficiently high value to permit curving of said sheet.

After heating of said sheet 1, this latter is brought towards the installation in accordance with the present invention by means of a roller conveyor 2.

The installation comprises in a general manner elements for shaping the sheet 1, means for applying said elements on each side of said sheet 1 and for curving this latter and means for sending jets of gas onto the sheet in order to temper this latter.

In accordance with the invention, one of the series of elements 3 has a surface 3a which is intended to come into contact with one of the faces of the glass sheet 1, the profile of which corresponds to the curvature to be given to said sheet. Said surface 3a extends transversely to the direction (which is perpendicular to the plane of FIG. 1) of displacement of the glass sheet.

The other series of elements 4 which is intended to come into contact with the other face of the glass sheet 1 has a stationary portion 5 and two movable portions 6, 7 which are fixed on each side of this latter and capable of pivoting about a pin 8, 9 which is parallel to the direction of displacement of the glass sheet 1, between a first position (as shown in FIGS. 3 and 4) and a second position (as shown in FIGS. 5 and 6) in which they form an angle a with said other portion 5 corresponding to the curvature to be given to the glass sheet 1.

It is apparent from FIG. 2 that the elements 3 and 4 as well as the elements 6 and 7 are constituted by blocks 10, 11 provided with through-ducts 12, 13 located at right angles to the block surfaces 3a, 4a, 6a, 7a which are intended to come into contact with the glass sheet 1. Said ducts 12, 13 are connected to a which is intended to temper the glass sheet 1.

The aforementioned blocks 10, 11 are of wood and preferably of plywood since this material is of low weight and its properties remain intact at high temperature.

It is further apparent from FIG. 2 that the surface of said blocks 10, 11 which is intended to come into contact with the glass sheet 1 is covered with glass fabric 15, 16 in order to prevent the surface of the glass sheet from being impaired.

Moreover, the ducts 12, 13 are constituted by metal tubes 12a, 13a which terminate at the surface of the blocks 10, 11 in frusto-conical portions 12b, 13b.

In the embodiment shown in FIGS. 1 to 6, the first series of elements 3 located above the glass sheet 1 is stationary whilst the second series of elements 4, 5, 6, 7 located beneath said sheet 1 can be displaced in a vertical plane P between a position (see FIGS. 3 and in spaced relation to the glass sheet 1 located between the two series of elements and a position (see FIG. 5) in which said second series of elements 4, 5, 6, lifts the glass sheet 1 and applies this latter against the first series of elements 3.

The installation in accordance with the invention is also provided with means for initiating the outward displacement of said elements 4, 5, 6, 7 after application of these latter on the glass sheet 1 and inward bending of this latter and for initiating the supply of the tempering gas jets via the ducts 12, 13 only on completion of this operation (see the arrows representing the air jets in FIG. 6).

Furthermore, the rollers 2 maintain the glass sheet 1 between the bearing surfaces of said elements 3, 4, 5, 6, 7 when these latter are at rest (see FIGS. 3 and 6).

By virtue of their rectilinear shape, said rollers are not liable at any moment to mark the surface of the glass, in contrast to the device described in patent No. WO-A-8901458 in which the glass sheet is in contact with wheels. Wheels of this type are in any case essential in order to bend the glass sheet in a circular arc.

Moreover, it is apparent from FIGS. 1 and 3, 4, 5, 6 that the blocks provided with through-ducts 12, 3 are adjacent to compartments 20, 21, 22, 23 having the function of supplying the tempering gas and forming part of the elements 3, 4, 6, 7.

The compartment 21 of the intermediate portion 5 of the movable element 4 is connected to the compartment 22, 23 of each of the pivoting portions 6, by means of a bellows seal 24, 25.

It can also be observed in FIG. 1 that the means for controlling the pivotal displacement of the pivoting portions 6, 7 comprise pneumatic or electric jacks 26, 27.

Moreover, the means for controlling the vertical displacement of the series of elements 4, 5, 6, 7 comprise vertical threaded rods 28 which are driven in rotation by a variable-speed motor and screwed into a nut 29, said nut being rigidly fixed to the frame 30 which supports the elements aforesaid.

In the alternative embodiment shown in FIGS. 7 and 8, the installation comprises a series of movable members 31 which are capable of bearing beneath the inwardly bent portion 1a of the glass sheet 1 when this latter undergoes tempering by the gas jets after it has been shaped.

The members 31 aforesaid are each pivotally mounted on a pin 32 which is located on one side of the installation and parallel to the direction of displacement of the glass sheet 1. Said members 31 each have a motor-driven roller 33 rotatably mounted at right angles to the longitudinal edge of the glass sheet 1. Said members are capable of pivoting between a position in which they are withdrawn from the glass sheet 1 (as shown in FIG. 7) and a position (shown in FIG. 8) in which the roller 33 bears beneath the surface of said sheet 1 in order to support the inwardly bent portion of this latter during the tempering operation illustrated in FIG. 7, in which the bearing members are withdrawn from said glass sheet.

In the example illustrated in FIGS. 7 and 8, only one side of the glass sheet 1 is inwardly bent.

In the tempering position, the edge 1b of the sheet 1 opposite to the inwardly bent portion 1a is retained by a wheel 34 which is applied against this latter. Said wheel 34 is rigidly fixed to a small plate 35 mounted so as to be capable of translational motion on a fixed horizontal support 36 between a withdrawn position (shown in FIG. 7) and a bearing position (shown in FIG. 8).

The operation of the installation in accordance with the invention will now be explained with reference to FIGS. 3, 4, 5, 6.

FIG. 3 shows the arrival of the hot and flat glass sheet 1 which rests on the rollers 2 between the shaping elements 3, 4, 6, 7, said elements being located in spaced relation to said sheet 1. In the accompanying figures, the top surface of the pivoting elements 6, 7 is located in the line of extension of the top surface of the intermediate element 4. However, this arrangement is not essential. It may in fact be preferable to ensure that the pivoting elements 6, 7 are located beneath the plane of the intermediate element 4 in the rest position In the second stage illustrated in FIG. 4, the set of elements 4, 6, 7 is displaced in the upward direction in order to lift the glass sheet 1 from the rollers 2 and in order to apply it against the stationary top element 3.

In the third stage shown in FIG. 5, the two lateral elements 6, 7 pivot and apply the two lateral sections of the glass sheet against the oblique lateral surfaces of the top stationary element 3. It can be understood that, by virtue of these pivoting elements 6, 7, it is possible to bend the lateral sections of the glass sheet at any angle a between 0 and 90°. Moreover, these lateral sections can have any desired curvature.

In the fourth stage illustrated in FIG. 6, the set of elements 4, 6, 7 is lowered vertically whilst the angle of pivotal displacement of the elements 6, 7 is maintained. The shaped glass sheet 1 is moved away from the stationary top element 3 and rests on the rollers 2.

Air is then sent through the ducts formed in the wood blocks which constitute the elements 3, 4, 6, 7 in order to temper the glass sheet and to cause it to set in the state in which it is curved or bent to convex form.

In order to guard against any danger of deformation of the bent lateral sections of the glass sheet, it is an advantage to make use of the lateral supports 31 having rollers 33 as shown in FIGS. 7 and 8.

By virtue of the fact that the glass sheet 1 is in spaced relation to the elements 3, 4, 6, 7 during the tempering operation, the tempering operation performed by the air jets directed at right angles to the two surfaces of the sheet is both efficient and uniform.

As will be readily apparent, the invention is not limited to the examples of construction which have just been described and any number of modifications may accordingly be contemplated without thereby departing from the scope of the invention.

Thus the lower shaping element 4 could be stationary and the upper element 3 could be movable.

Control of pivotal displacement of the elements 6, 7 could be effected by means other than jacks.

Similarly, the vertical displacement of the element 4 could be carried out by means other than threaded rods screwed into nuts.

What is claimed is:

1. An installation for curving or bending to convex form and tempering a glass sheet (1) comprising means for heating said sheet, means for bringing said sheet into position between elements (3, 4, 6, 7) which serve to shape said sheet, means for applying said elements on each side of said sheet and for curving this latter and means for sending jets of gas onto the sheet in order to temper this latter, wherein one of the series (3) of elements has a surface (3a) which is intended to come into contact with one of the faces of the glass sheet (1) and has a predetermined profile corresponding to the curvature to be given to said sheet, said surface (3a) being such as to have a substantially flat portion bordered on at least one side by a section which is inclined at an angle (a) with respect to said flat portion and extends transversely to the direction of displacement of the glass sheet, and wherein the other series of elements (4, 6, 7) which is intended to come into contact with the other face of the glass sheet has a stationary portion (5) corresponding to the substantially flat central portion of the surface (3a) of the element (3), at least one movable portion (6 or 7) being attached to said stationary portion and capable of pivoting about a pin (8, 9) which is parallel to the direction of displacement of the glass sheet (1), between a first position and a second position in which said movable portion is inclined at an angle (a) with respect to said stationary portion (5) corresponding to the curvature to be given to the glass sheet.

2. An installation according to claim 1, wherein said elements (3, 4, 6, 7) are constituted by blocks (11, 12) having through-ducts (12, 13) perpendicular to the surface of said blocks which is intended to come into contact with the glass sheet (1), said ducts (12, 13) being connected to a source (14, 14a) of gas which has the function of tempering the glass sheet.

3. An installation according to claim 2, wherein said blocks (11, 12) are of wood.

4. An installation according to claim 2, wherein the surface (3a, 4a, 6a, 7a) of said blocks which is intended to come into contact with the glass sheet (1) is covered with glass fabric (15, 16).

5. An installation according to claim 1, wherein the aforementioned other series of elements has a stationary portion (5) to which are pivotally attached on each side two movable portions (6, 7) which are capable of displacement between said first and second positions.

6. An installation according to claim 1, wherein the first series of elements (3) located above the glass sheet (1) is stationary whilst the second series of elements (4, 6, 7) located beneath said sheet (1) is displaceable in a vertical plane (P) between a position in spaced relation to the glass sheet (1) located between the two series of elements and a position in which said second series of elements lifts the glass sheet and applies this latter against the first series of elements (3).

7. An installation according to claim 1, wherein said installation comprises means for initiating the outward displacement of said second series of elements (4, 6, 7) after application of said elements on the glass sheet and inward bending of said sheet and for initiating the supply of the tempering gas jets only on completion of this operation.

8. An installation according to claim 1, wherein the glass sheet (1) is supported by rollers (2), wherein said rollers (2) maintain the glass sheet (1) between the two bearing surfaces (3a; 4a, 6a, 7a) of said elements when these latter are at rest.

9. An installation according to claim 2, wherein the blocks (10, 11) provided with through-ducts (12, 13) are adjacent to compartments (20, 21, 22, 23) which serve to admit the tempering gas and form part of said elements, the compartment (21) of the intermediate portion (4) of the movable element being connected to the compartment (22, 23) of each of the pivoting portions (6, 7) by means of a bellows seal (24, 25).

10. An installation according to claim 6, wherein the means for controlling the pivotal displacement of said pivoting portions (6, 7) comprise jacks (26, 27).

11. An installation according to claim 6, wherein the means for controlling the vertical displacement of one of the series of elements (4, 6, 7) comprise rotatably driven threaded rods (28) screwed into a nut (29) which is rigidly fixed to said elements.

12. An installation according to claim 1, wherein said installation comprises a movable member (31) which is capable of bearing beneath the inwardly bent portion (1a) of the glass sheet (1) when said sheet is subjected to tempering by the gas jets after the shaping operation.

13. An installation according to claim 12, wherein the elements aforesaid are provided with members (31) pivotally mounted on one side of the installation and each fitted with a roller (33) rotatably mounted at right angles to the longitudinal edge of the glass sheet (1), said members (31) being capable of pivotal displacement between a withdrawn position with respect to the glass sheet (1) and a position in which the roller (33) is applied beneath the surface of the inwardly bent portion (1a) of said sheet.

* * * * *